April 30, 1968 A. B. BERGH ET AL 3,381,279

READ ONLY MEMORY

Filed April 21, 1966 2 Sheets-Sheet 1

INVENTORS
ARNDT B. BERGH
CHARLES W. NEAR

BY R. C. Smith

ATTORNEY

INVENTORS
ARNDT B. BERGH
CHARLES W. NEAR
BY A. C. Smith
ATTORNEY

United States Patent Office 3,381,279
Patented Apr. 30, 1968

3,381,279

READ ONLY MEMORY

Arndt B. Bergh, Palo Alto, and Charles W. Near, Sunnyvale, Calif., assignors to Hewlett-Packard Company, Palo Alto, Calif., a corporation of California Filed Apr. 21, 1966, Ser. No. 544,194
9 Claims. (Cl. 340—173)

ABSTRACT OF THE DISCLOSURE

A set of drive lines and a set of sense lines are arranged in a generally transverse relationship on opposite sides of an insulating layer. The drive lines include a reference line arranged for inductively coupling a reference signal to each sense line in response to a driving signal. They also include a plurality of word lines each arranged for inductively coupling an add signal or a cancel signal to each sense line in response to a driving signal. Selection apparatus is connected to each drive line for providing a driving signal path along the reference line and a selected word line. A sense amplifier is connected to each sense line for indicating one binary digit in response to the combination of a reference signal and an add signal and for indicating another binary digit in response to the combination of a reference signal and a cancel signal.

This invention relates to inductive read only memories for use in storing binary information and has as its principal object the provision of a read only memory which gives a signal output for a stored binary "one (1)" and a no-signal output for a stored binary "zero (0)." Another object of this invention is to provide a read only memory which stores more binary information per unit area than most conventional read only memories.

These objects are accomplished in accordance with the illustrated embodiments of this invention by mounting a plurality of horizontal sense lines in a generally common direction along one side of an insulating layer and by mounting a vertical reference line and a plurality of vertical word lines in a generally common direction along the other side of the insulating layer in generally intersecting relationship to the sense lines. The reference line is provided with a uniform coupling pattern for inductively coupling a reference signal to each of the sense lines. Each of the word lines is provided with a coupling pattern selected for inductively coupling either an add signal or a cancel signal to each of the sense lines to provide in combination with the corresponding reference signal either a signal output or a no-signal output indicating a stored binary "one" or "zero" respectively. The stored binary information is obtained by providing means for directing a driving signal along the reference line to inductively couple a reference signal to each sense line and along a selected word line to inductively couple either an add or a cancel signal to each sense line depending on the coupling pattern of the selected word line.

Other and incidental objects of this invention will be apparent from a reading of this specification and an inspection of the accompanying drawing in which.

Figure 1:
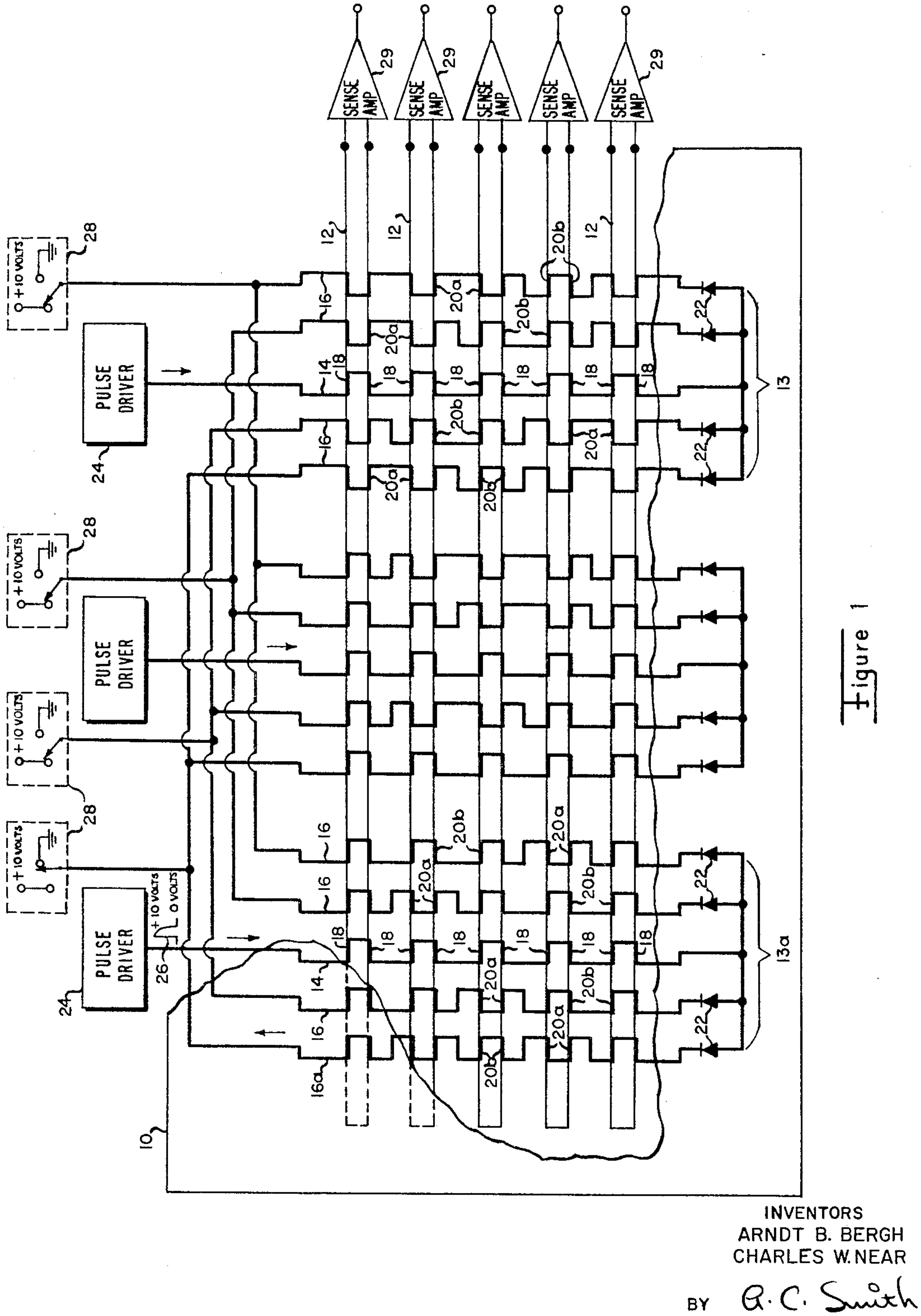
FIGURE 1 is a partially cut-away top view of one embodiment of this invention.
Figure 2:
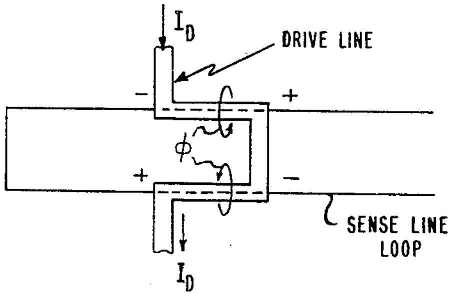
FIGURE 2 is a detail view illustrating the coupling mechanism between the drive lines and the sense lines of FIGURE 1.

Referring to FIGURE 1, there is shown a thin insulating layer 10 which is partially cut away to reveal a plurality of horizontal loop-shaped sense lines 12 fixedly mounted in a common direction along the bottom side of the insulating layer. A number of groups 13 of vertical drive lines 14 and 16 are fixedly mounted in a generally common direction along the top side of the insulating layer 10 in generally orthogonally intersecting relationship to the horizontal sense lines 12. Each of these drive lines 14 and 16 comprises a ladder-type line having selected horizontal segments which are arranged in a single vertical column for conserving space and increasing the amount of binary information stored per unit area and which are mounted in parallel alignment with the opposite sides of each sense line loop 12 for coupling a signal to each sense line loop. As shown in detail in FIGURE 2, the two horizontal drive line segments mounted in parallel alignment with the opposite sides of each sense line loop 12 are arranged to couple in a series aiding sense. The direction of driving current signal $I_D$ flow through each drive line 14 or 16 determines the polarity of the signal coupled to each sense line 12. The magnitude of the coupled signals is determined by the length of the horizontal drive line segments, the thickness of the insulating layer 10, the accuracy of alignment of the horizontal drive line segments with the sense lines 12, and the amplitude and rise time of the current drive signal to be applied to the drive line.

Each of the groups 13 of vertical drive lines includes a single reference line 14 and a plurality of word lines 16. The reference line 14 of each group 13 includes horizontal segments 18 which are mounted in parallel alignment with each side of each sense line loop 12 to form a uniform coupling pattern for inductively coupling a reference voltage signal to each sense line 12. Each word line 16 of each group 13 includes horizontal segments 20 which are mounted in parallel alignment with each side of each sense line loop 12 and in either the same or the opposite electrical sense with respect to the reference line 14 depending upon whether a binary "one (1)" or "zero (0)" is to be stored. For example, the horizontal segments 20*a* of each group 13 are mounted in the same electrical sense as the corresponding segments 18 of the reference line 14 for inductively coupling an add signal to each of the adjacent sense lines 12 to produce in combination with the corresponding reference signal a signal output indicative of a stored binary "one (1)." Similarly, the horizontal segments 20*b* of each group 13 are mounted in the opposite electrical sense from the corresponding segments 18 of the reference line 14 for inductively coupling a cancel signal to each of the adjacent sense lines 12 to produce in combination with the corresponding reference signal a substantially no-signal output indicative of a stored binary "zero (0)." Thus, binary information is stored by controlling the coupling segment pattern of each word line 16.

For each group 13 of drive lines one end of the reference line 14 is connected by a plurality of selection diodes 22 mounted on the insulating layer 10 to one end of each of the word lines 16. A pulse driver circuit 24 is connected to the other end of the reference line 14 for applying a current driving pulse to the reference line. The current driving pulse may be derived from a voltage pulse 26 because of the inductance of the reference line. A different one of a plurality of switching circuits 28 is connected to the other end of each word line 16 for selectively forward and reverse biasing the diodes 22 to provide a driving signal path including the reference line 14 and a selected word line 16 for the current driving pulse. As the current driving pulse passes along the reference line 14 it inductively couples a reference voltage signal to each sense line 12, and as it passes along the selected word line 16 it inductively couples an add or a cancel voltage signal to each sense line 12 depending on the coupling pattern of the selected word line. The add or cancel voltage signal coupled to each sense line 12 combines with the corresponding reference voltage signal to produce a signal or substantially no-signal output indicating a stored binary "one" or "zero" respectively. Thus, with the switches 28 actuated to the position shown in FIGURE 1 a current driving pulse applied to the reference line 14 of group 13*a* is directed to the word line 16*a* thereby producing a signal or no-signal output on each sense line 12 which reading from top to bottom may be represented by the binary number 01010. A low impedance sense amplifier 29 which has common mode rejection is connected to each sense line loop 12 for amplifying the output voltage level. The signal no-signal output obtained with this read only memory permits one to obtain the selected binary information merely by sensing the amplified output voltage level rather than by detecting the polarity of the output voltage. Moreover, the quantity of word line selection circuits, drive lines, and connectors required for this read only memory is greatly reduced because one pulse driver 24 and one reference line 14 serve a plurality of word lines 16 for each group 13 and because, as shown in FIGURE 1 where each word line 16 of each group 13 is connected to a different word line 16 of each of the other groups 13, a single switching circuit 28 serves as many word lines 16 as there are groups 13.

Although in the above illustration for each group 13 the selection diodes 22 have been shown and described as being connected between one end of the reference line 14 and one end of each of the word lines 16, they may also be connected to the other end of the word lines 16. However, by connecting the diodes 22 between the reference line 14 and the word lines 16 as shown in FIGURE 1 the undesired drive voltage capacitively coupled to the sense lines 12 from the unselected word lines 16 is reduced since the diodes 22 connected to the unselected word lines are all reverse biased by the switching circuits 28, and therefore virtually no drive voltage appears on these unselected word lines.

Figure 3:
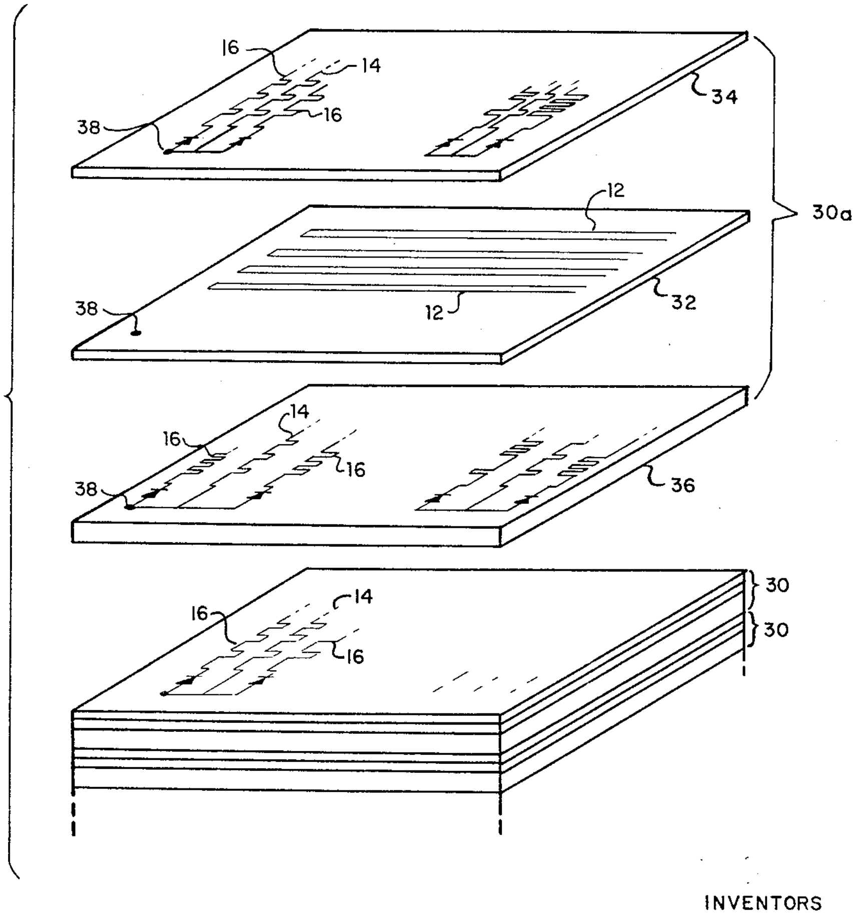
FIGURE 3 is a partially exploded perspective view of a multiple layer embodiment of this invention.

Referring now to FIGURE 3, there is shown a multiple layer read only memory comprising a plurality of sections 30 each of which is formed in accordance with the above-described principles. The first section 30*a* is shown exploded to illustrate the construction of these sections. A plurality of sense lines 12 are attached to the top side of insulating layer 32 and groups of drive lines, each of which groups includes a reference line 14 and a plurality of word lines 16, are attached to the top side of each of the insulating layers 34 and 36. These sense lines 12 and drive lines 14 and 16 are arranged and connected in the same manner as shown in FIGURE 1 and the layers are aligned and sealed together as illustrated by the remaining sections 30. The insulating layers 32 and 34 may be made only one or two mils in thickness to maximize the magnitude of the output signals. However, the insulating layer 36 must be made thick enough to isolate the section 30*a* from the adjacent sections 30 and prevent cross coupling of signals between sections. Conductive connections 38 may be made between selected word lines 16 of different layers as well as between different word lines of each group attached to the same layer to minimize the quantity of word line selection and driving circuitry required for the read only memory.

We claim:

1. A memory device for storing information, said memory device comprising:

a plurality of sense lines spacedly mounted in a generally common direction;

reference means for coupling a reference signal to each of said sense lines; and a plurality of word lines spacedly mounted in a generally common direction and in fixed spatial relationship to said sense lines, each of said word lines being mounted in generally transverse relationship to said sense lines and including means for coupling another signal to each of said sense lines to produce in combination with the corresponding reference signal a selected output signal that is indicative of a portion of the information stored within the memory device.

2. A memory device as in claim 1 wherein:

said reference means includes a reference line connected to each of said word lines, said reference line including means for coupling a reference signal to each of said sense lines;

said memory device includes an insulating layer;

said sense lines are mounted in a generally common direction adjacent to one side of said insulating layer; and said word lines and said reference line are mounted in a generally common direction adjacent to the other side of said insulating layer in generally transverse relationship to said sense lines.

3. A memory device as in claim 2 wherein:

said means for coupling a reference signal to each of said sense lines comprises selected segments of said reference line, said segments being mounted in substantially parallel alignment with each of said sense lines for inductively coupling a reference signal to each of said sense lines; and said means for coupling another signal to each of said sense lines comprises selected segments of each of said word lines, said segments of each of said word lines being mounted in substantially parallel alignment with each of said sense lines for inductively coupling another signal to each of said sense lines to produce in combination with the corresponding reference signal the selected output signal that is indicative of a portion of the information stored within the memory device.

4. A memory device as in claim 3 including selection means for directing a driving signal along a driving signal path including said reference line and a selected word line to produce the selected output signal.

5. A memory device as in claim 4 wherein:

each of said sense lines is loop-shaped; and the selected segments of each of said word lines and said reference line are arranged in parallel columns and mounted in substantially parallel alignment with each side of said sense line loops.

6. A memory device as in claim 5 wherein:

each of the selected segments of said reference line is mounted in the same one electrical sense along one of said sense line loops; and each of the selected segments of each of said word lines is mounted along one of said sense line loops either in said one electrical sense or in the opposite electrical sense depending on the information to be stored in the memory device.

7. A memory device as in claim 4 including:

another insulating layer one side of which is mounted adjacent to said one side of said first-mentioned insulating layer;

another reference line mounted adjacent to the other side of said other insulating layer in generally transverse relationship to said sense lines and including selected segments mounted in substantially parallel alignment with each of said sense lines for inductively coupling a reference signal to each of said sense lines;

another plurality of word lines connected to said other reference line and mounted with said other reference line in a generally common direction adjacent to the other side of said other insulating layer in generally transverse relationship to said sense lines, each of said other word lines including selected segments mounted in substantially parallel alignment with each of said sense lines for inductively coupling another signal to each of said sense lines to produce in combination with the corresponding reference signal a selected output signal that is indicative of a portion of the information stored within the memory device; and means for directing a driving signal along a driving signal path including said other reference line and a selected one of said other word lines to produce the selected output signal.

8. A memory device as in claim 5 wherein said selection means comprises:

signal driving means for supplying a driving signal to said reference line;

a plurality of diodes each of which is connected to one end of each of said word lines; and switching means for selectively forward and reverse biasing each of said diodes to direct the driving signal along said selected word line.

9. A memory device as in claim 8 including a sense amplifier connected to each sense line loop.

References Cited

UNITED STATES PATENTS

| | | | |
|---|---|---|---|
| 3,245,054 | 4/1966 | Byron et al. | 340—173 |
| 3,287,706 | 11/1966 | Rogers | 340—173 |

TERRELL W. FEARS, *Primary Examiner.*